United States Patent
Brichet

(10) Patent No.: US 6,621,885 B2
(45) Date of Patent: Sep. 16, 2003

(54) APPARATUS AND A METHOD FOR ASSEMBLING A SPACER GRID OF A FUEL ASSEMBLY FOR A NUCLEAR REACTOR

(75) Inventor: Christophe Brichet, Parnans (FR)

(73) Assignee: Societe Franco-Belge de Fabrication de Combustible-FBFC, Courbevoie (FR)

(*) Notice: Subject to any disclaimer, the term of this patent is extended or adjusted under 35 U.S.C. 154(b) by 0 days.

(21) Appl. No.: 10/149,619

(22) PCT Filed: Dec. 7, 2000

(86) PCT No.: PCT/FR00/03435

§ 371 (c)(1),
(2), (4) Date: Jun. 12, 2002

(87) PCT Pub. No.: WO01/45114

PCT Pub. Date: Jun. 21, 2001

(65) Prior Publication Data

US 2002/0191729 A1 Dec. 19, 2002

(30) Foreign Application Priority Data

Dec. 13, 1999 (FR) .............................................. 99 15693

(51) Int. Cl.7 .................................................. G21C 3/352
(52) U.S. Cl. ........................................ 376/438; 29/468
(58) Field of Search ................................ 376/438, 442, 376/443; 29/468

(56) References Cited

U.S. PATENT DOCUMENTS

| | | | | |
|---|---|---|---|---|
| 3,892,027 A | * | 7/1975 | Jabsen | 29/723 |
| 4,530,146 A | * | 7/1985 | Vere et al. | 29/468 |
| 4,636,606 A | * | 1/1987 | Chastanet et al. | 219/121.63 |
| 4,680,443 A | * | 7/1987 | Vere et al. | 219/121.14 |
| 5,110,539 A | * | 5/1992 | Perrotti et al. | 376/439 |
| 5,265,130 A | * | 11/1993 | Yoshida et al. | 376/245 |
| 5,367,549 A | * | 11/1994 | Hatfield | 376/462 |
| 5,808,271 A | * | 9/1998 | Duthoo | 219/121.64 |

FOREIGN PATENT DOCUMENTS

| | | |
|---|---|---|
| EP | 0 104 119 | 3/1984 |
| EP | 0 163 568 | 12/1985 |
| EP | 00869197 A1 * | 10/1998 |
| EP | 00908898 A1 * | 4/1999 |
| FR | 2 533 352 | 9/1982 |
| FR | WO-99003108 * | 1/1999 |

* cited by examiner

Primary Examiner—Peter M. Poon
Assistant Examiner—Daniel Matz
(74) Attorney, Agent, or Firm—Kenyon & Kenyon

(57) ABSTRACT

The assembly apparatus comprises a frame for supporting the straps of the first set of straps in mutually parallel positions, clamping and engagement for clamping on each of the straps of a second set of straps in succession and for engaging them with the straps of the first set in position in the support frame, and at least one comb that is movable between a disengaged position and a position in which it engages each of the straps of the first set.

10 Claims, 7 Drawing Sheets

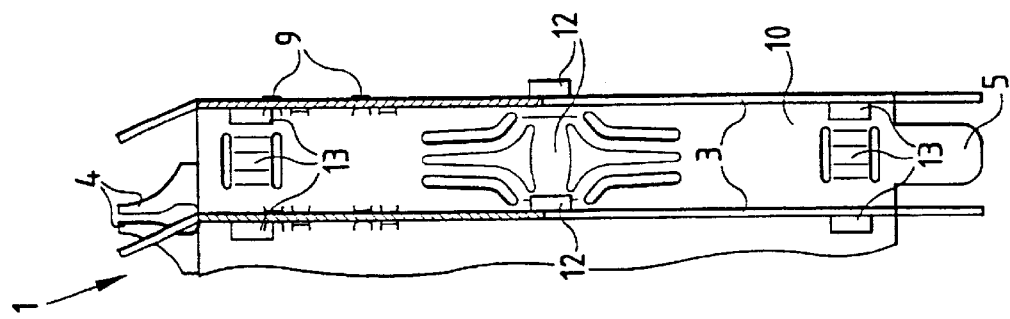
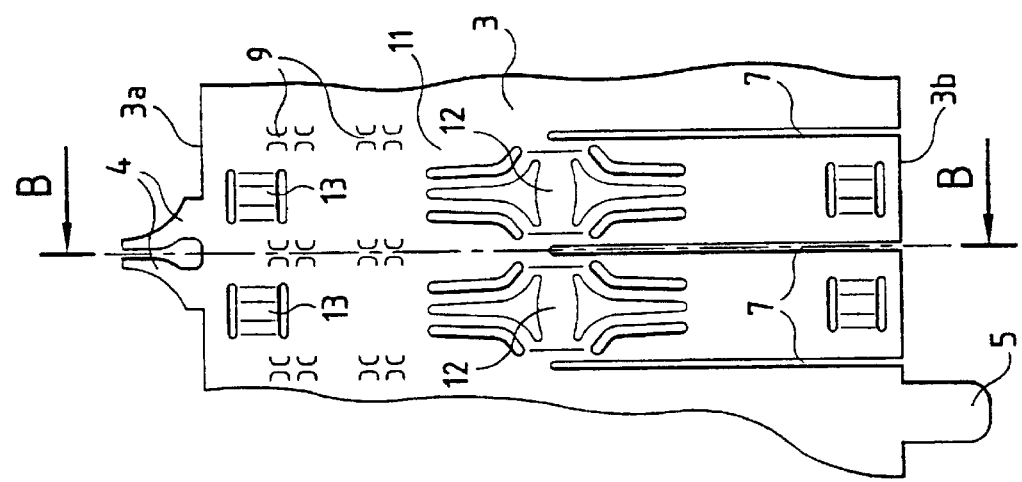
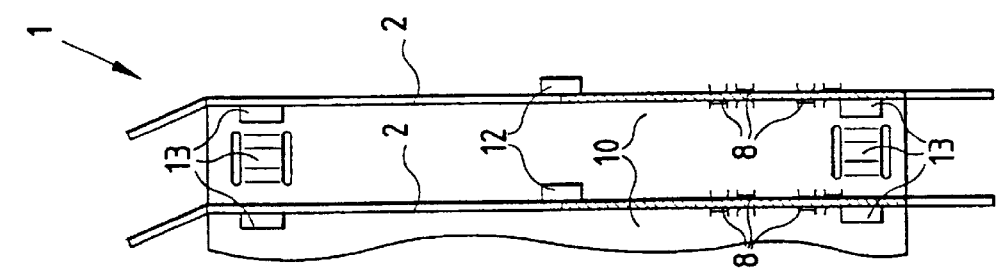
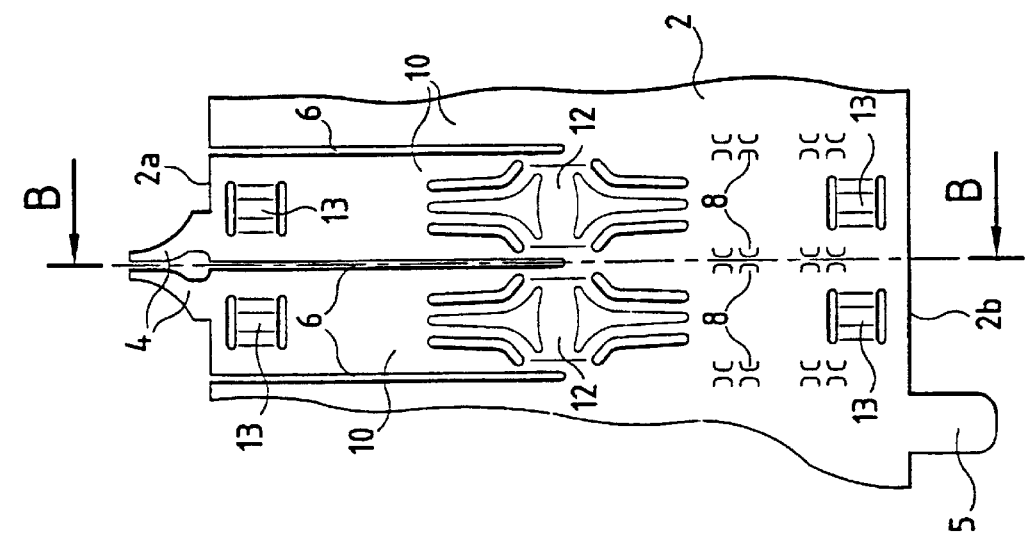

APPARATUS AND A METHOD FOR ASSEMBLING A SPACER GRID OF A FUEL ASSEMBLY FOR A NUCLEAR REACTOR

FIELD OF THE INVENTION

The invention relates to apparatus for assembling a spacer grid of a fuel assembly for a nuclear reactor, and in particular a fuel assembly for a nuclear reactor that is cooled by pressurized water.

BACKGROUND INFORMATION

The fuel assemblies of water-cooled nuclear reactors and in particular the fuel assemblies of pressurized water-cooled nuclear reactors comprise a skeleton for holding fuel rods in the form of a bundle in which the rods are all parallel to one another.

The skeleton comprises in particular spacer grids that are spaced apart along the length of the fuel assembly, each grid presenting an array of cells through which the fuel rods are inserted. The skeleton of a fuel assembly also comprises guide tubes which are inserted in some of the cells in the spacer grids in the place of fuel rods and which serve to fix the spacer grids in positions that are spaced apart along the length of the guide tubes of the fuel assembly.

Spacer grids are constituted by crossed rectangular metal straps assembled together at right angles along the edges of the cells for receiving fuel rods, which cells are in the shape of rectangular parallelepipeds.

The metal straps of a spacer grid constitutes first and second sets of mutually parallel straps that are assembled together in crossed manner with the straps of the second set being perpendicular to the straps of the first set. The straps are assembled together at each edge by interengaging two straps via slots each extending over half the width of the straps, each of the straps having a set of slots that are spaced apart in pairs by a constant distance in the length direction of the straps.

In this manner, the rectangular cells for receiving the fuel rods (or possibly guide tubes) have four walls each, each wall being constituted by a portion of a strap extending between two successive slots.

Inside each cell for receiving a fuel rod, on two walls of a cell that meet at an angle, there are disposed springs, while on two opposite walls there are disposed rigid bearing dimples so that the rods are held between at least two sets of springs and dimples within each cell. In this manner, the rods are held effectively while still being capable of moving relative to the spacer grids under the effect of thermal expansion inside the nuclear reactor in operation.

The cooling water of the nuclear reactor flows in the longitudinal direction of the fuel rods, which is generally the vertical direction inside a reactor that is in operation.

Within the bundle of rods in the fuel assembly, in order to achieve good distribution and effective heat exchange between the cooling water and the rods, the spacer grids have mixing vanes along the top edges of the rod-receiving cells, which vanes are shaped by being cut out at the same time as the straps are cut out and by being folded towards the insides of the cells.

One of the edges of each strap also has tabs for assembling the spacer grid to guide tubes. The mixing vanes and the tabs are constituted by portions projecting width-wise from the edges of the straps and obtained when the straps are cut out.

The springs and the dimples on the walls of the cells in the grid can be obtained by cutting and embossing the metal of the straps.

In some fuel assemblies, the spring can alternatively be separate fittings applied to the walls of the cells when the spacer grid is assembled.

In general, the straps of spacer grids are made of zirconium alloy. When separate fitted springs are used, the springs can be made of nickel alloy.

The manufacture of spacer grids includes a step of cutting out the straps to a generally rectangular shape from a sheet of zirconium alloy, which cutting-out operation serves to form the mixing vanes and the tabs on the edges of the straps. The straps are also cut at regular intervals to obtain rectilinear assembly slots extending across at least half the width of each strap. Finally, the straps are cut and embossed to make the dimples and possibly also the springs.

A second operation in manufacturing spacer grids consists in assembling the spacer grid by engaging the metal straps of two sets of parallel straps in a disposition where they cross at 90°. This operation must be performed carefully since it determines whether the proper geometrical characteristics are obtained for the spacer grid. These geometrical conditions themselves have a major influence on the quality of the operation and on the performance of the fuel assembly.

In order to improve the positioning of the straps relative to one another at the time of assembly, it is possible to provide plunged bosses made by cutting and embossing the metal of the straps along the assembly edges of the cells.

Once the spacer grid has been assembled by assembling the straps constituting the inner straps of the grid in a crossed configuration, a framework of outer straps is mounted around the periphery of the grid. Thereafter, the grid is placed in a welding jig and the straps are welded together along the edges of the cells.

A spacer grid can be assembled by assembling together two sets of mutually parallel straps in a manner that is entirely manual, with the straps of a first set of straps being placed in parallel dispositions within a jig and with the straps of the second set of straps being assembled manually one by one by interengaging their slots in the assembly slots of the straps in the first set of straps.

Such a manual operation is lengthy and does not make it possible to guarantee that the spacer grid is of perfect geometrical quality. French patent No. 2 533 352 proposes a method and apparatus for assembling spacer grid straps that enable the straps of the second set of straps to be inserted one by one in the assembly portions of the straps of the first set of straps held in a jig, that operation being performed by using moving equipment for inserting the straps of the second set of straps, one by one, said equipment including means for clamping each strap in a position that facilitates its insertion. The jig is movably mounted on a fixed structure of an assembly apparatus to move in a direction parallel to the longitudinal direction of the straps in the first set of straps that are in position in the jig, and the moving equipment can be moved in a direction that is orthogonal to the travel direction of the jig for the purpose of inserting a strap held by the clamping means.

By moving the jig in the longitudinal direction of the straps in the first set of straps, the assembly portions of the straps in the first set of straps are brought successively into a disposition for engaging a strap of the second set of straps as carried by the moving equipment.

In addition to means for clamping onto a strap in the second set of straps, the moving equipment also comprises a comb for engaging on the straps of the first set of straps to hold them in zones close to the zones where they engage with the strap of the second set of straps while engagement is taking place.

After a strap of the second set of straps has been engaged, it is necessary to retract the means that were clamping onto the strap in the second set of straps that has just been engaged and also to retract the comb that serves to hold the straps of the first set of straps.

Those operations require the strap clamping elements to be put into an open position and the straps of the first set of straps to be moved a little in the longitudinal direction, together with the moving support for the straps of the first set of straps.

The operations of disengaging the comb and the means for clamping onto the straps of the second set of straps are thus relatively lengthy, and at the end of the operation they require the position of the moving support for the straps of the first set of straps to be initialized followed by displacement of the moving support to a new engagement position.

In certain designs of fuel assembly for pressurized water nuclear reactors, the spacer grids have wider springs and longer mixing vanes, and the fixing tabs on the guide tubes are disposed on the edge of each strap opposite from the edge on which the mixing vanes are disposed. Those spacer grids cannot be assembled with the prior art assembly machine because the wider springs of a strap do not leave enough room to pass the mixing vanes of the strap which is being engaged. Because the mixing vanes are longer and because the tabs are disposed on the side of the strap opposite from the side on which the mixing vanes are located, it is necessary for the straps to be moved through a much longer distance for engagement purposes.

To assemble certain spacer grids, there is a manual method like the method described above. The straps of the first set of straps are placed parallel to one another in the grooves of a jig, and the straps of the second set of straps are engaged manually one by one after being fitted with clips for holding down the springs in the thickness of a strap.

Manually assembling the straps is a lengthy operation requiring competent personnel to be employed, and even then there is no guarantee that the geometry of the spacer grid will be perfect.

In addition, the springs are held out of the way in mechanical manner by means of clips, thus exerting stresses on the straps.

The manufacture of straps includes an operation of cutting the straps out from a sheet, which operation serves both to obtain the cutout edges of the straps having the appropriate shapes, and also to obtain internal cutouts in the straps to constitute the slots or notches, the assembly bosses, the dimples, and possibly also the springs. Punching out straps gives rise to stresses and deformation due to portions of a strap being indented. After cutting out, the strap is therefore no longer accurately plane. It is therefore necessary to counter or indeed eliminate this deformation by using appropriate apparatus in order to make it easier, or even possible, to assemble the straps together.

It is also necessary to ensure that the clips that hold the springs down do not add additional deformation while the straps of the second set of straps are being engaged.

No previously known apparatus or method enables the above-recalled drawbacks of prior art assembly apparatuses and methods to be remedied, particularly with certain designs of spacer grid.

SUMMARY

The object of the invention is thus to propose apparatus for assembling a spacer grid of a fuel assembly for a nuclear reactor, the grid being constituted by a first set of metal straps of generally rectangular shape that extend parallel to one another, and a second set of metal straps that are rectangular, parallel to one another, and that cross the strap of the first set of straps in planes perpendicular to the straps of the first set, the straps being assembled together by interengagement via slots that are spaced apart at a constant distance in the length direction of the straps, the slots occupying at least half the width of the straps so as to constitute a regular array of rectangular cells, each cell being defined by four walls, each wall being constituted by a portion of a strap that lies between two successive slots, each strap carrying a set of springs projecting from at least one face of the strap over at least a fraction of the portions between the slots of the strap, the assembly apparatus comprising a frame for supporting the straps of the first set of straps so that they are disposed parallel to one another, clamping and engagement means for clamping on each of the straps of the second set of straps in succession and for engaging them with the straps of the first set of straps in position in the support frame, and at least one comb movable between a disengaged position and an engaged position with each of the straps of the first set when in position in the support frame, the comb occupying a position adjacent to a slot for engaging a strap of the second set of straps, said apparatus enabling certain designs of spacer grid to be assembled quickly and automatically while avoiding indentation deformation of the straps during assembly.

For this Purpose:

the support frame is secured to a fixed structure;

the clamping and engagement means and the comb are mounted to move in respective planes perpendicular to the straps of the first set in position in the support frame, on a carriage itself mounted to move in a direction parallel to the longitudinal direction of the straps of the first set on the fixed structure; and the clamping means comprise two jaws movable in translation in the same direction and in opposite directions under the control of a cam, and the studs for retracting springs of a strap of the second set engaged in the clamping means by pressing them into the thickness of the strap.

BRIEF DESCRIPTION OF THE DRAWINGS

In order to make the invention well understood, there follows a description given by way of example and with reference to the accompanying figures of a spacer grid and apparatus for assembling the spacer grid in accordance with the invention.

FIG. 1A is an elevation view of a portion of a strap in a first set of straps for a spacer grid which is assembled using the apparatus of the invention.

FIG. 1B is a section view on B—B of FIG. 1A through a portion of a spacer grid.

FIG. 2A is an elevation view of a portion of a strap of the second set of straps of the spacer grid.

FIG. 2B is a section view on B—B of FIG. 2A illustrating a portion of the spacer grid.

FIG. 10 is a plan view looking along arrow 10 in

FIG. 9 of the jaw of the configuration for clamping together with a strap in position on the clamping jaw.

DETAILED DESCRIPTION

Figure 3:
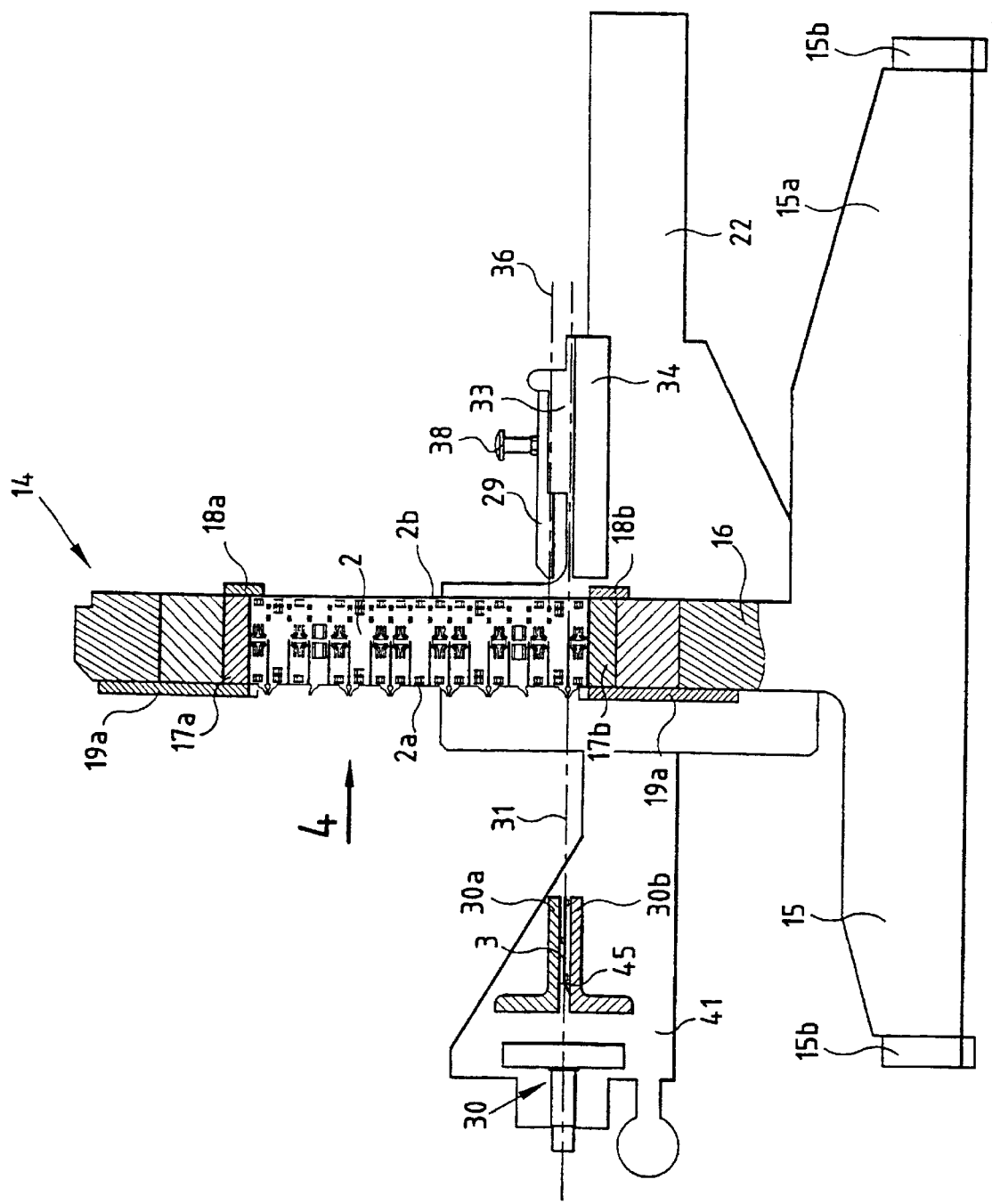
FIG. 3 is an elevation view and a vertical section view through apparatus of the invention.

FIG. 1A illustrates a portion of a strap 2 of a first set of straps in a spacer grid, and FIG. 2A illustrates a strap 3 of a second set of straps for assembling to the straps of the first set of straps in order to obtain a spacer grid 1, with an assembled portion thereof being shown in FIG. 2B.

The straps 2 and 3 are generally rectangular in shape and are defined by a first longitudinal edge referred to as a top edge 2a (or 3a for the strap 3) and a second longitudinal edge that is opposite and referred to as the bottom edge 2b (or 3b for the strap 3). The edges 2a or 3a and 2b or 3b are referred to as being top or bottom respectively relative to the positions they occupy in the spacer grid 1 when the fuel assembly is in operation.

In FIGS. 1A and 2A, there may be seen only a lengthwise portion of inner straps for constituting spacer grids, which portion, as explained below, serves to constitute the wall of two adjacent cells for holding respective fuel rods.

The top edges 2a or 3a of the straps 2 or 3 are cut in such a manner that pairs of streamlined mixing vanes 4 are formed on either side of a junction zone between two consecutive cells.

The bottom edges 2b or 3b are cut out in such a manner as to provide fixing tabs 5 for fixing the spacer grid to a guide tube. Each assembly tab 5 extends from the middle portion of a section of the strap that is to constitute a wall of a cell for receiving a guide tube. The straps 2 and 3 also have cutouts made in the metal of the strap between the top and bottom edges 2a & 2b or 3a & 3b. The straps 2 of the first set of straps have slots 6 cut through the entire thickness of the strap and extending in its width direction, i.e. perpendicularly to the edges 2a and 2b, said slots extending transversely from the top edge 2a of the strap 2 down to a zone situated approximately halfway across the width of the straps, the slots 6 being of a length that is not less than half the width of the strap 2. The slots 6 are spaced apart from one another in the longitudinal direction of the strap (the horizontal direction in FIG. 1A) by a constant distance corresponding to the width of a cell for receiving a fuel rod.

In like manner, the strap 3 of the second set of straps has slots 7 extending from the bottom edge 3b of the strap, going across the width of the strap, with the length of each slot 7 being not less than half the width of the strap 3.

In line with the slots 6, and on either side of a transverse straight line, plunged bosses 8 (or 9) are formed by being cut out and then being pressed towards the outside of the strap, as can be seen in FIGS. 1B and 2B.

The spacer grid 1 is assembled by assembling the straps 2 and 3 by engaging the straps 3 on the straps 2 so that the planes of the straps 2 and 3 are mutually perpendicular, with the straps being engaged in the transverse direction of the slots 6 and 7, thereby enabling the straps to be assembled with halved-joints. The bosses 8 and 9 facilitate guidance and positioning of the straps relative to one another.

As explained below, the assembly apparatus of the invention uses a jig serving to hold the straps 2 of the first set of straps in parallel dispositions, the longitudinal sides of the straps of the first set being vertical, and enables the straps of the second set of straps to be engaged in a horizontal disposition with the straps of the first set of straps that are placed vertically. As a result, the straps in the first set of straps may be referred to as vertical straps and the straps in the second set of straps may be referred to as horizontal straps, even though this position does not correspond to the position occupied by the straps in a fuel assembly that is in operation.

Between two successive slots 6 or 7 and in line therewith in the transverse direction, there is defined a strap section 10 (or 11) for constituting a wall of a rectangular cell of square section for receiving a fuel rod (or possibly a guide tube).

The sections 10 and 11 of the straps constituting cell walls for receiving fuel rods are cut out in their transverse end portions in such a manner as to constitute bearing dimples 13 which are embossed outwards relative to the plane of the corresponding strap, as may be seen in FIGS. 1B and 2B.

In their central portions, the sections 10 and 11 of the straps 2 and 3 are cut out in such a manner as to constitute springs 12 which are embossed out from the plane of the corresponding strap 2 or 3.

As may be seen in FIGS. 1B and 2B, the dimples 13 and the springs 12 are embossed in such a manner as to project from opposite faces of the strap in each of the sections 10 or 11.

In this manner, once the spacer grid 1 has been assembled to constitute a square mesh array of rectangular cells of square section, each of the cells that is to receive a fuel rod has two walls provided with springs 12 each placed facing a wall having two dimples 13 in its end portions.

While the straps of the second set of straps are being engaged in a transverse direction defining two adjacent sections 10 of a strap of the first set of straps, the vanes 4 of the straps of the first set of straps which are folded out from the plane of the strap on either side of the transverse line cannot pass between the springs 12 of the strap of the second set of straps because these broad springs do not leave enough space between one another along the direction extending transversely to the engagement direction.

In addition, the engagement length of the straps relative to one another is increased by the length of the vanes and the tabs which project from opposite edges of the straps.

The, apparatus of the invention described below with reference to FIGS. 3 to 8 serves to enable the straps to be interengaged while the springs are retracted, and eliminating deformation of the straps by indentation.

Figure 4:
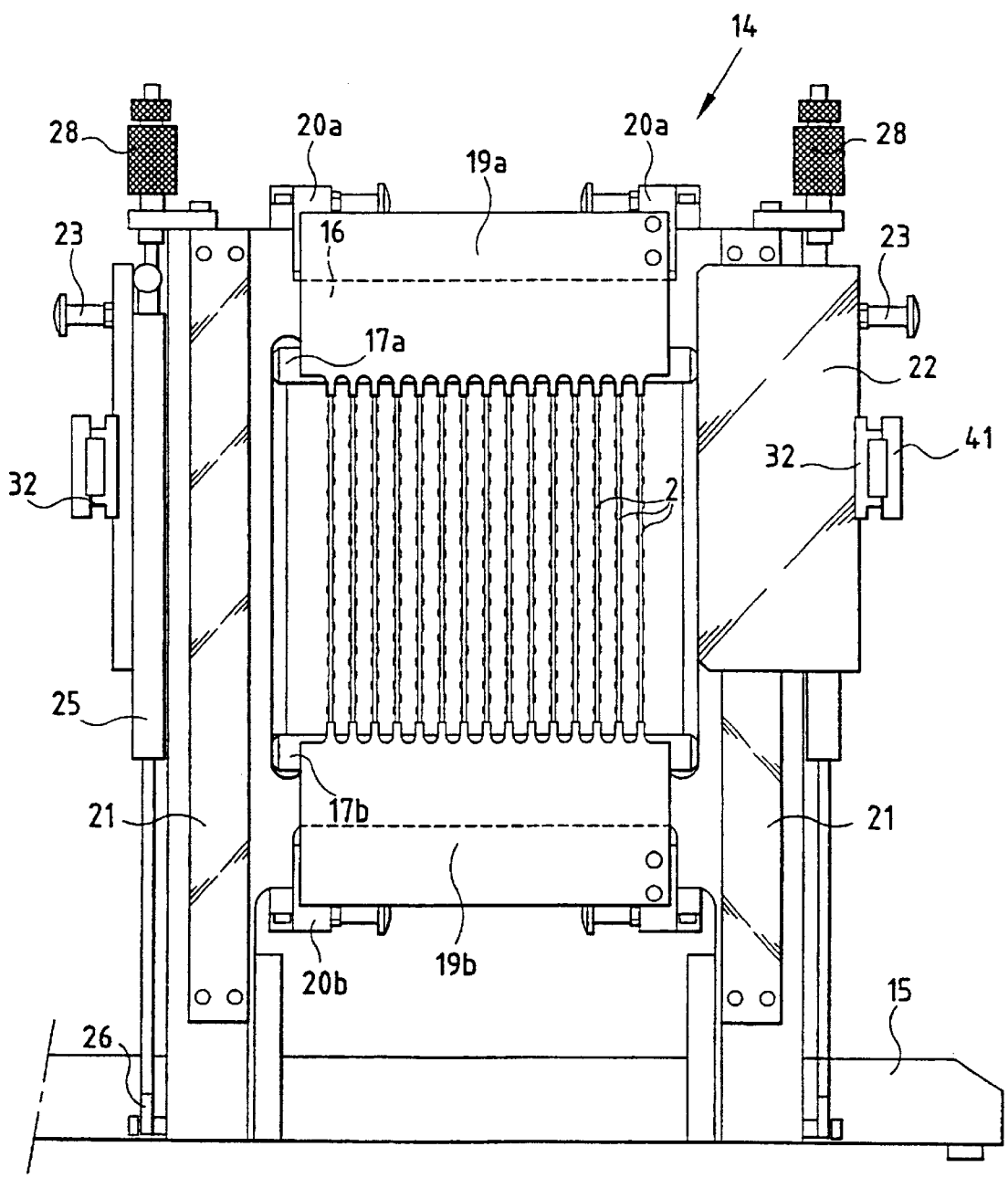
FIG. 4 is a front view of the FIG. 3 assembly apparatus seen looking along arrow 4.

FIGS. 3 and 4 illustrates the assembly apparatus of the invention given overall reference 14.

The assembly apparatus 14 comprises a fixed structure 15, itself constituted by a base 15a having legs 15b enabling the apparatus to be placed on a bench, and a vertical support frame 16 in the form of a window frame. The window of this frame contains a top guide 17a and a bottom guide 17b in horizontal dispositions along the horizontal top and bottom edges of the window frame 16 that is substantially square in shape.

Each of the top and bottom guides 17a and 17b has a set of engagement notches for receiving the longitudinal end portions of the straps 2 of the first set of straps in a mutually parallel disposition inside the window of the frame 16, the longitudinal direction of the straps being vertical.

The notches in the guides 17a and 17b are disposed one after another in the corresponding longitudinal direction of the guide and of the window in the frame at a constant spacing, with successive notches in the top and bottom guides being placed vertically in register with one another. The guides 17a and 17b constitute two rulers whose successive graduations are constituted by the notches and serve to receive the straps 2 in positions that are defined in very accurate manner.

As may be seen in FIG. 3, the straps 2 are engaged in the guide notches 17a and 17b by inserting their bottom edges 2b first, with the bottom edges 2b being stopped at the end of an engagement stroke by abutments 18a and 18b secured to the rear portions of the guides 17a and 17b respectively.

The top and bottom portions of the frame 16 of the fixed structure 15 have movably mounted thereon respectively a top flap 19a and a bottom flap 19b that may be moved by respective indexing devices 20a and 20b between a position in which the window in the frame 16 is disengaged so as to allow the straps 2 to be engaged, and a position in which the straps 2 are held in the window in the frame 16. The flaps 19a and 19b have crenellated edges for pressing against the straps 2.

The frame 16 carries two vertical slideways 21 having a carriage 22 mounted to move thereon in a vertical direction, i.e. parallel to the longitudinal direction of the straps 2. The carriage 22 comprises two uprights engaged respectively on the slideways 21 on either side of the frame 16 (only one upright being shown in FIG. 4).

Each of the uprights of the vertically-movable carriage 22 includes an indexing unit (visible in particular in FIG. 6), and on each side of the frame 16 there are placed indexing devices each having a spring-loaded finger for engaging in an opening 27 in an indexing unit 24 in order to fix the carriage 22 in the vertical direction. The openings 27 are in vertical alignment and they are spaced apart by a constant distance along the indexing unit 24 in such a manner as to enable the carriage 22 to be stopped and fixed in various successive positions corresponding to the positions for engaging a strap of the second set of straps in a set of slots in the straps of the first set of straps carried by the frame 16.

Each of the indexing units 24 also includes a device 28 for fine adjustment of height enabling the stop positions of the carriage to be adjusted very accurately by co-operation between the fingers of the indexing devices 23 and the openings 27.

As may be seen in FIG. 3, the vertically-displaceable carriage 22 has a guide configuration in a horizontal direction perpendicular to the longitudinal direction of the straps 2 of the first set of straps carried by the frame 16, on which a carriage can be moved for carrying a comb 29 for holding the straps of the first set of straps and a carriage for supporting a clamp 30 for holding a strap of the second set of straps for engagement with the straps of the first set of straps carried by the frame 16.

As may be seen in FIG. 3, the clamp 30 carried by the carriage 41 may move in a horizontal plane represented by line 31 in FIG. 3 containing the engagement line of a horizontal strap 3 of the second set of straps with the set of vertical straps 2 carried by the frame 16.

Figure 5:
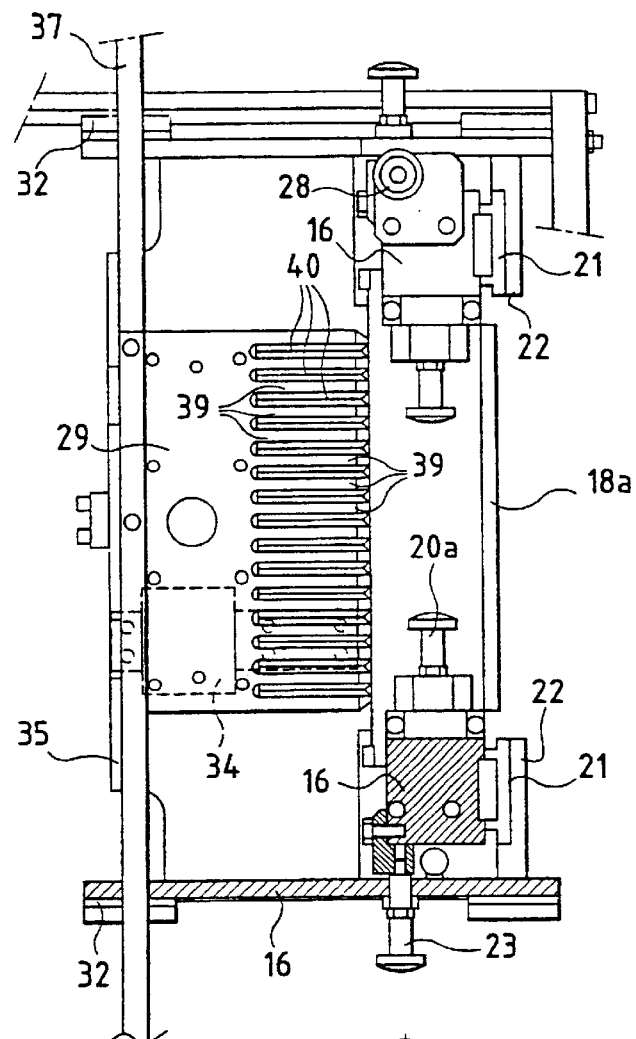
FIG. 5 is a fragmentary plan view of the assembly apparatus.
Figure 6:
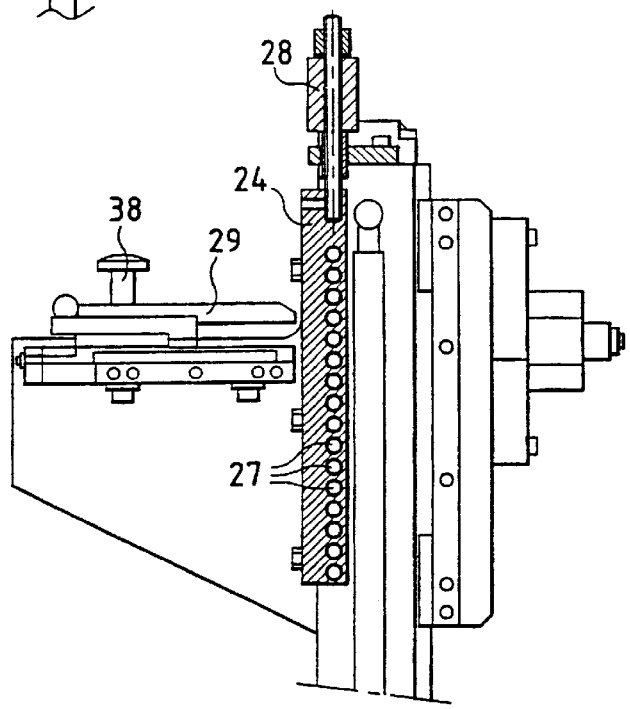
FIG. 6 is a fragmentary side elevation view of the assembly apparatus.

As may be seen in FIGS. 3, 4, and 5, the carriage 41 for moving the clamp 30 moves on slideways 32 carried by the uprights of the vertically-movable carriage 22.

The clamp 30 may be moved between a retracted position as illustrated in FIG. 3 and a position for engaging a strap 3 of the second set of straps, on the front side of the assembly apparatus 14, i.e. adjacent to the top edges 2a of the straps 2 of the first set of straps. The carriage for moving the clamp constitutes the front horizontal carriage.

The comb 29 is mounted on a rear horizontal carriage 33 which moves on slideways 34 carried by a plate 35 placed between the two vertical side uprights of the carriage 22.

The rear horizontal carriage for moving the comb 29 moves in a horizontal plane represented by line 36 in FIG. 3, corresponding to the engagement plane of a strap of the second set of straps in a position adjacent to the engagement position of the strap 3 that is engaged in the clamp 30. The comb 29 carried by the carriage 33 may move between a retracted position illustrated in FIG. 3 and an engaged position in which the teeth of the comb engage the straps 2 carried by the frame 16 in such a manner as to hold the straps in a zone adjacent to the engagement zone with the strap 3 of the second set of straps.

The vertically-movable carriage 22 may be moved manually. from a first position to a second position in which it engages one of the straps 3 of the second set of straps, and the front and rear horizontal carriages may likewise be moved manually between their retracted positions and their positions in which they engage the straps of the spacer grid. The comb 29 has a manual insertion control 37 in the form of a push bar that is accessible from both sides of the assembly apparatus. The carriage of the comb 29 also has an indexing management 38 (FIG. 6) for adjusting the engagement stroke of the comb relative to the straps 2 placed in a parallel configuration inside the frame 16.

As may be seen in FIG. 5, the comb 29 comprises a plate with successive comb teeth 39 being cut out therein and spaced apart from one another by slots 40 of a width that is slightly greater than the thickness of a strap of the spacer grid.

By advancing the comb 29 manually, the straps 2 of the first set of straps are inserted into the slots 40 of the comb so that the straps 2 of the first set of straps are held securely in a zone that is close to the zone in which the strap 3 of the second set of straps is to be engaged.

Once the comb has been engaged, the straps 2 of the first set of straps are in abutment against the bottoms of the slots 40 between the teeth of the comb. This serves to hold the straps of the first set of straps securely during engagement of the strap 3 of the second set of straps. Putting the straps 2 of the first set of straps into abutment against the bottoms of the slots 40 separating the teeth 39 of the comb 29 is achieved by the indexing 38 of the carriage 33 for moving the comb 29.

This avoids bending the straps 2 of the first set of straps while the strap 3 of the second set of straps is being engaged, thus limiting deformation of the straps in zones adjacent to the engagement zones.

Figure 8:
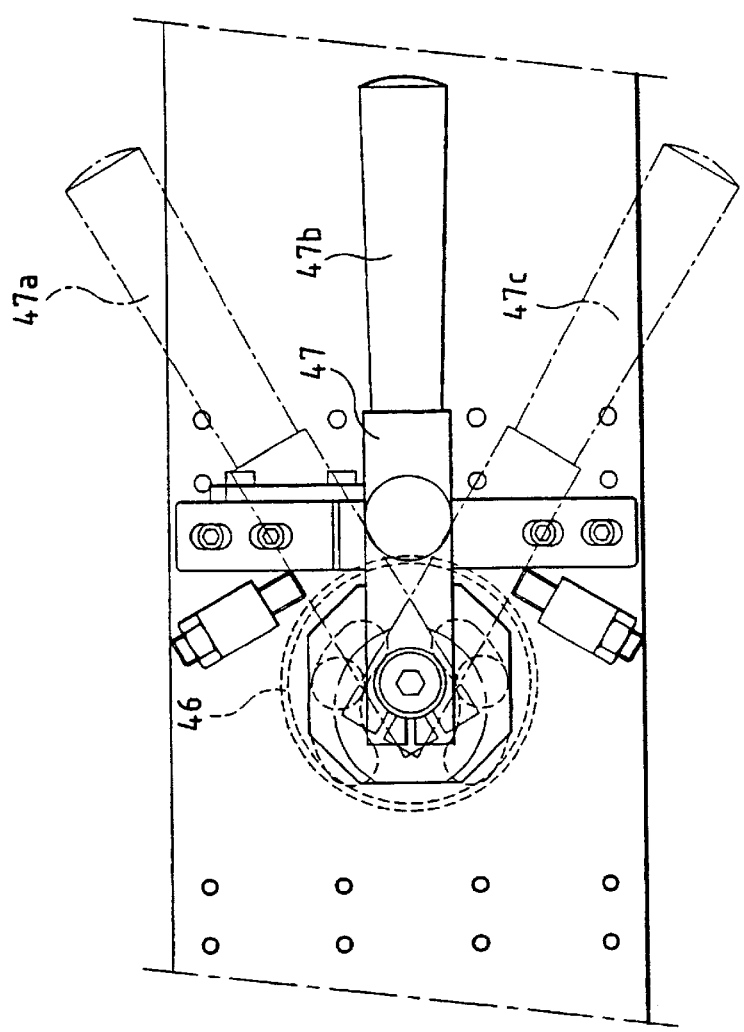
FIG. 8 is a front view of the FIG. 7 configuration looking along arrow 8.
Figure 7:
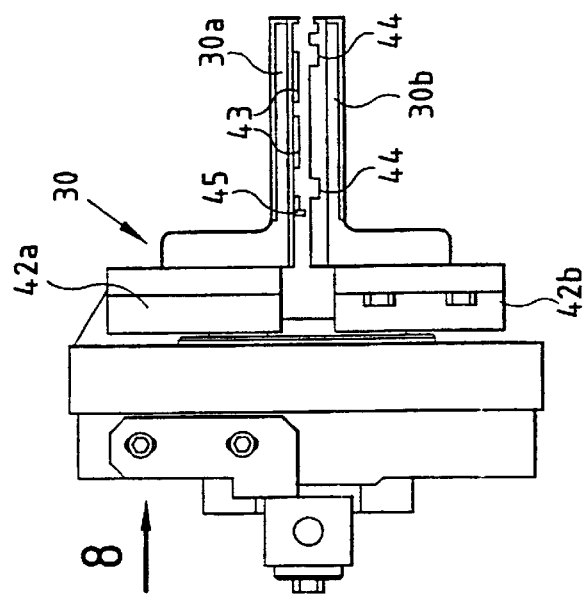
FIG. 7 is a side elevation view of a configuration for clamping a strap in the second set of straps.

The clamp 30 carried by the horizontally-movable front carriage 41 is shown in greater detail in FIGS. 7 and 8.

The clamp 30 has a top jaw 30a and a bottom jaw 30b that move vertically and that are guided respectively in the vertical direction on the clamp support secured to the carriage 41 by a guide device 42a for the top jaw 30a and by a guide device 42b for the bottom jaw 30b.

The top jaw 30a has a bottom actuation surface situated facing the top actuation surface of the bottom jaw 30b.

Figure 9:
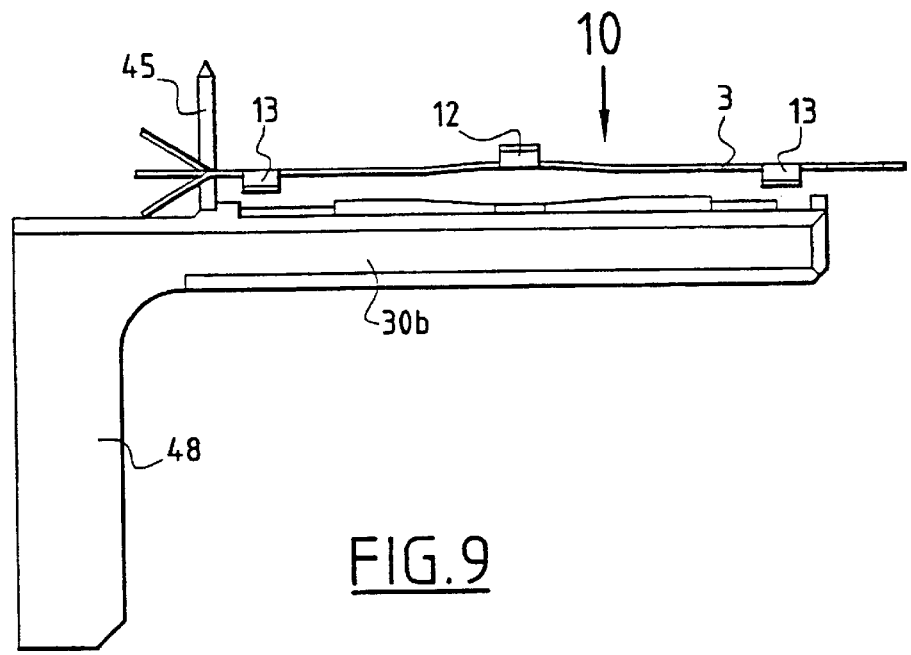
FIG. 9 is a side view of a jaw of the configuration for clamping straps of the second set of straps.
Figure 10:
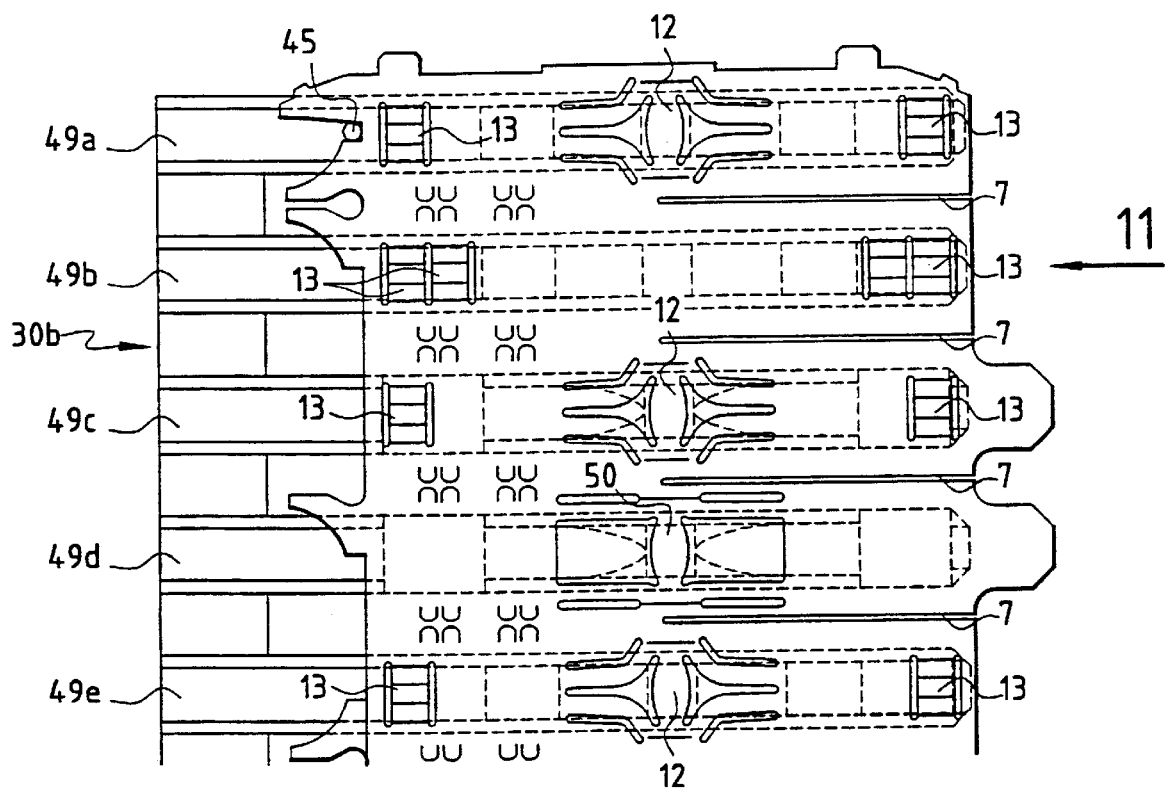
Figure 11:
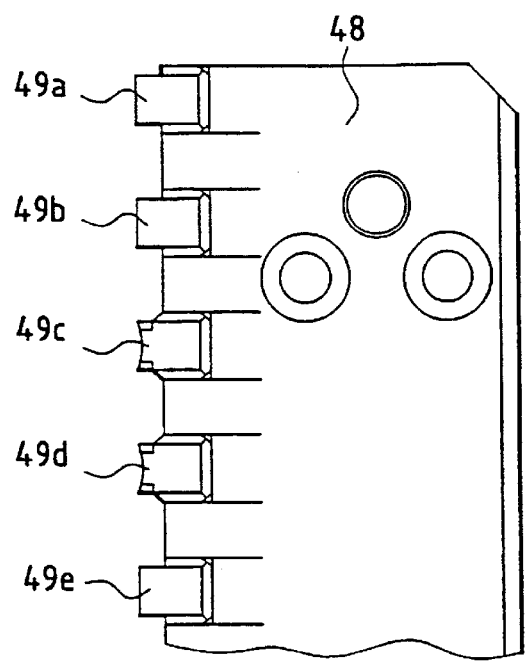
FIG. 11 is a view seen looking along arrow 11 of FIG. 10.

FIGS. 9, 10, and 11 illustrates the jaw 30b of the clamp on which the strap 3 of the second set of straps has been put into place, prior to the jaws 30a and 30b being clamped together and prior to engagement with a strap 2 of the first set of straps. The strap 3, which is placed with its longitudinal direction extending along the longitudinal direction of the jaw 30b, has its top edge bearing against two pegs such as 45 of the jaw 30b constituting positioning abutments placed at the longitudinal edges of the jaw 30b. The jaw 30b (like the jaw 30a) has a stub 48 with successive fingers such as 49a, 49b, 49c, 49d, and 49e being fixed thereto so as to extend perpendicularly to the surface of the stub 48 and extend in the longitudinal direction of the jaw 30b one after another and at a fixed spacing equal to the spacing of two successive cell walls of the strap 3. The jaw of the clamp is in the form of a comb whose teeth are spaced apart from one another, the width of the fingers in the longitudinal direction of the jaw being significantly smaller than the width of a cell wall of the strap 3. The assembly slots 7 of the straps 3 for engaging the straps 2 are placed in respective gaps between pairs of successive fingers when the strap 3 is in place on the jaw 30b.

As may be seen in FIGS. 10 and 11, the successive fingers 49a, 49b, 49c, 49e, and 49e are not identical. The fingers 49a and 49e which come into contact with walls having two dimples 13 projecting towards the jaw 30b at the ends of the walls, and a spring 12 projecting away from the jaw 30b in the middle of the walls have a profile in their longitudinal direction as shown in FIG. 9. The finger 49b is designed to come into contact with a wall having two dimples 13 projecting from its ends. Finally, the fingers 49c and 49d are designed to come into contact with two walls of a cell adjacent to a cell receiving a guide tube.

Figure 12:
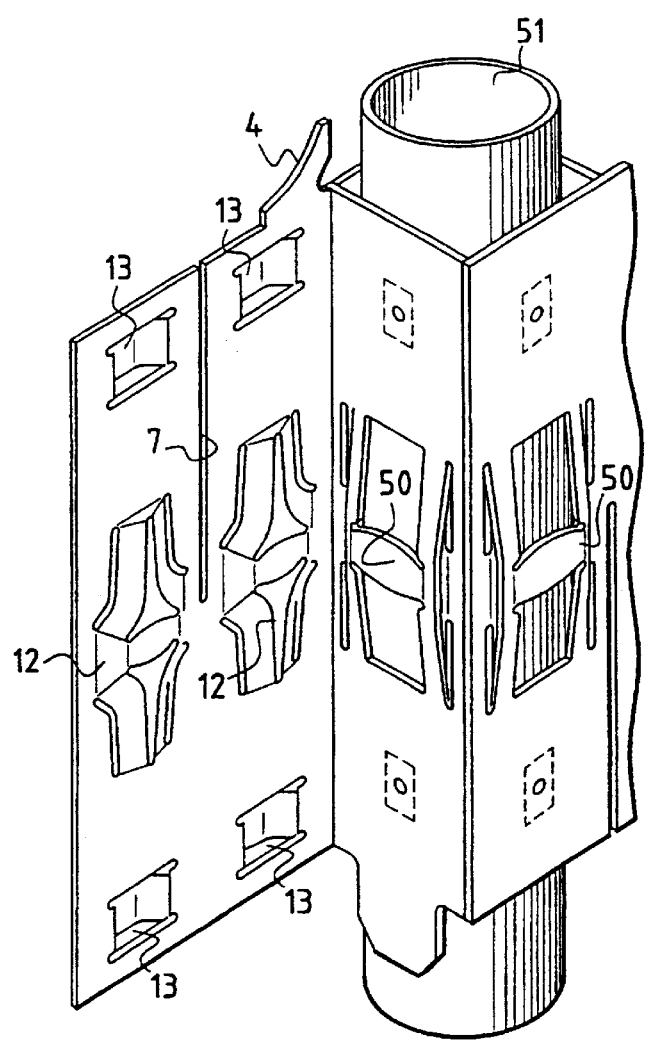
FIG. 12 is an exploded perspective view of cells in a spacer grid adjacent to a cell receiving a guide tube.

As may be seen in FIG. 12, the walls of cells adjacent to the cell receiving the guide tube 51 have springs 50 on their walls that are common with the wall of the cell receiving the guide tube 51, which springs 50 are of a special shape and they are referred to as H springs. In addition, these common walls are of a curved shape. As a result, the fingers 49c and 49d have a special shape and a concave contact surface, as may be seen in FIGS. 10 and 11.

In general, and as may be seen in FIG. 7, the jaws 30a and 30b placed facing each other and serving to clamp the strap 3 between them have projecting portions 43 for retracing the springs and recessed portions 44 for receiving the dimples when the clamp is tightened prior to engaging a strap 3 in the set of straps 2.

The movements of the jaws 30a and 30b of the clamp are entirely symmetrical and they are obtained by a cam 46 controlled by a lever 47 which may be placed in one of three positions 47a, 47b, and 47c.

When the lever is in position 47a, the cam holds the clamp at its widest opening to enable a strap to be put into place between the jaws 30a and 30b of the clamp.

In position 47c, the cam 46 closes the clamp, the strap 3 of the second set of straps then being compressed between the jaws of the clamp in such a manner that its springs are fully retracted into the thickness of the strap.

In the intermediate position 47b, the jaws 30a and 30b of the clamp are moved far enough apart to enable the clamp to be withdrawn after it has engaged the strap 3 of the second set of straps, while avoiding interfering with the straps of the spacer grid that have already been put into place during such withdrawal.

Abutments serve to stop the lever in its operating positions.

The straps of a spacer grid are put into place using the apparatus of the invention in the manner described below with reference to all of the figures. Initially, the straps of the first set of straps in a spacer grid, e.g. sixteen straps, are put into place in the frame 16 in vertical positions. The flaps 19a and 19b of the frame 16 are retracted and the straps 2 of the first set of straps are inserted one after another into the notches of the guides 17a and 17b of the frame 16.

After inserting all of the straps 2 in the window of the fixed frame, the flaps 19a and 19b are moved into their locking positions against the top edges 2a of the straps 2 with the bottom edges 2b of the straps being pressed against the abutments 18a and 18b.

The position of the vertically-movable carriage 22 is adjusted so that a first plane for engaging a strap 3 of the second set of straps lies in the horizontal displacement plane 31 of the front carriage 41.

A first strap 3 of the second set of straps is placed between the jaws 30a and 30b of the clamp 30 while it is in its open position. The strap 3 is pushed until it bears against the abutment 45. The jaws of the clamp are then closed so as to clamp onto the strap 3 of the second set of straps and flatten the springs into the thickness of the strap. The compression force required is determined beforehand so as to enable the springs to be retracted sufficiently to allow the mixing vanes on the straps of the first set of straps to pass through while avoiding any permanent deformation of the springs.

The comb 29 is then manually engaged with the straps of the first set of straps that are in position in the window of the frame 16, with the holding portions of the comb between successive pairs of teeth 39 coming to bear against the straps 2 of the first set of straps in zones adjacent to the zones for engagement with the strap 3 of the second set of straps and situated in the plane 31, thus ensuring that the straps in the first set of straps are not deformed.

The carriage 41 is then moved from its retracted position to its position for engaging the strap 3 on the straps 2 of the first set of straps.

The jaws 30a and 30b of the clamp 30 in the clamping position serve to eliminate and avoid deformation of the strap of the second set of straps so that the strap 3 of the second set of straps can be engaged without difficulty. At the end of engagement, the carriage 41 is stopped by an abutment. The jaws 30a and 30b of the clamp 30 are then placed in the intermediate position so as to enable the clamp to be extracted while leaving the strap 3 in its assembled position.

The carriage 41 with the clamp 30 and the carriage 33 with the comb 29 are put back in their retracted positions.

The carriage 22 is then moved so as to bring the displacement planes 31 and 36 of the clamp 30 and of the comb 29 respectively into register with a plane for engaging a strap 3 of the second set of straps adjacent to the strap 3 which had just been put into place in an adjacent plane.

The above-described operations are performed to put a strap of the second set of straps into place in the clamp 30, to put the comb into place, to engage the strap, and then to disengage both the clamp and the comb.

The vertically-movable carriage 22 is then moved again so as to enable a strap 3 of the second set of straps to be engaged in a new engagement zone adjacent to the second engagement zone.

While the clamp is being withdrawn, the intermediate open position for the jaws of the clamp serves to avoid any interference with the straps of the second set of straps already in place.

This makes it possible to install all of the straps of the second set of straps in succession and very quickly in corresponding engagement planes relative to the straps of the first set of straps.

Throughout all of the engagement operations, the springs are retracted so there is no difficulty in passing the mixing vanes between adjacent springs.

The use of a comb and a clamp also makes it possible to avoid deforming the straps.

At the end of assembly, the resulting spacer grid thus presents a geometrical shape that is entirely satisfactory.

Assembly of the spacer grid is then finished off by welding the straps 2 and 3 of the first and second sets of straps, referred to as "inner" straps, to "outer" straps that constitute the peripheral wall or belt of the spacer grid.

Because the front and rear horizontal carriages carrying the clamp and the comb move on tracks carried by the vertically-displaceable carriage, it is possible to place the clamp and the comb vertically in position in a single operation without any need to move the support holding the strap of the first set of straps. Similarly, the clamp can be withdrawn after engaging a strap of the second set of straps without moving the support for the straps of the first set of straps.

The invention is not limited to the embodiment described above.

Thus, certain elements of the apparatus, for example the clamp, the vertically-movable carriage, or the frame supporting the straps of the first set of straps could be made differently.

The invention is not limited to making spacer grids for fuel assemblies for pressurized water nuclear reactors having rectangular cells of square section.

In general, the apparatus of the invention can be used for making any spacer grid having rectangular cells.

What is claimed is:

1. Apparatus for assembling a spacer grid of a fuel assembly for a nuclear reactor, the grid being constituted by a first set of metal straps of generally rectangular shape that extend parallel to one another, and a second set of metal straps that are rectangular, parallel to one another, and that cross the strap of the first set of straps in planes perpendicular to the straps of the first set, the straps being assembled together by interengagement via slots that are spaced apart at a constant distance in a length direction of the straps, the slots occupying at least half a width of the straps so as to constitute a regular array of rectangular cells, each cell being defined by four walls, each wall being constituted by a portion of a strap that lies between two successive slots, each strap carrying a set of springs projecting from at least one face of the strap over at least a fraction of the portions between the slots of the strap, the assembly apparatus comprising a frame configured to support the straps of the first set of straps so that they are disposed parallel to one another, clamping and engagement arrangement configured to clamp on each of the straps of the second set of straps in succession and to engage them with the straps of the first set of straps in position in the support frame, and at least one comb movable between a disengaged position and an engaged position with each of the straps of the first set when in position in the support frame, the comb occupying a position adjacent to a slot configured to engage a strap of the second set of straps, wherein:

the support frame configured to support the straps of the first set of straps is secured to a fixed structure;

the clamping and engagement arrangement and the comb are mounted to move in respective planes perpendicular to the straps of the first set of straps in position in the support frame and in a direction parallel to the straps of the first set of straps, on a first carriage itself mounted on a first guide arrangement secured to the fixed structure to move in a direction parallel to a longitudinal direction of the straps of the first set of straps;

said first carriage carrying a second guide arrangement configured to guide a second carriage and a third guide arrangement configured to guide a third carriage, on respective first and second sides of the support frame, in planes perpendicular to the straps of the first set of straps and in directions parallel to straps of the first set of straps;

said clamping and engagement arrangement being fixed on said second carriage and said comb on said third carriage for being moved towards and away from the support frame in opposite directions, on the first and second sides of the support frame;

the clamping arrangement comprises two jaws movable in translation parallely to each other in opposite directions under the control of a cam and studs for retracting springs of a strap of the second set of straps engaged in the clamping arrangement by pressing them into the thickness of the strap.

2. The assembly apparatus according to claim 1, wherein the comb comprises successive teeth separated by slots for engaging the comb with practically no clearance on the straps of the first set of straps in a position that is adjacent to a plane for engaging a strap of the second set of straps.

3. The assembly apparatus according to claim 1, wherein the fixed structure comprises a base configured to stand on a plane horizontal surface, and a vertical frame including a window configured to receive the straps of the first set of straps so that their longitudinal direction is vertical.

4. The assembly apparatus according to claim 3, wherein a top guide and a bottom guide are disposed along two horizontal edges of the window in the frame, the guides having notches configured to receive longitudinal end portions of the straps of the first set of straps, the notches being spaced apart at regular intervals along the horizontal edges of the window in the support frame.

5. The assembly apparatus according to claim 4, wherein the carriage is mounted to move in the vertical direction parallel to the longitudinal direction of the straps of the first set of straps on two vertical slideways disposed along two side uprights of the frame.

6. The assembly apparatus according to claim 5, wherein the frame and the carriage have complementary indexing arrangements enabling the carriage to be placed in a plurality of assembly positions corresponding to a plurality of positions for engaging straps of the second set of straps on the straps of the first set of straps.

7. The assembly apparatus according to claim 6, wherein the indexing arrangement is constituted by two indexing units and two indexing fingers carried respectively by the carriage and by the frame, the indexing units having aligned openings, and the indexing fingers being actuatable for insertion into the openings and being disposed laterally on either side of the carriage.

8. The assembly apparatus according to claim 1, wherein the clamping arrangement is constituted by a clamp wherein clamping jaws have actuating surfaces facing each other, at least one of the actuating surfaces having projecting studs configured to retract the springs of a strap of the second set of straps inserted between the actuating surfaces of the jaws of the clamp by pressing against them.

9. The assembly apparatus according to claim 8, wherein the cam for controlling displacement of the jaws of the clamp is connected to a control lever that can be placed in at least one of a first position in which the clamp is wide open for inserting a strap of the second set of straps in the clamp, and in a position in which the clamp is closed for clamping on the strap of the second set of straps, for retracting the springs of the strap of the second set of straps, and for engaging the strap of the second set of straps in the straps of the first set of straps, and in a position between the wide-open position and the closed position to enable the clamp to be extracted after engaging the strap of the second set of straps on the straps of the first set of straps.

10. A method of assembling a spacer grid of a fuel assembly for a nuclear reactor, the grid being constituted by-a first set of metal straps of generally rectangular shape that extend parallel to one another, and a second set of metal straps that are rectangular, parallel to one another, and that cross the strap of the first set of straps in planes perpendicular to the straps of the first set, the straps being assembled together by interengagement via slots that are spaced apart at a constant distance in a length direction of the straps, the slots occupying at least half a width of the straps so as to constitute a regular array of rectangular cells, each cell being defined by four walls, each wall being constituted by a portion of a strap that lies between two successive slots, each strap carrying a set of springs projecting from at least one face of the strap over at least a fraction of the portions between the slots of the strap, by using an assembly apparatus comprising a frame configured to support the straps of the first set of straps so that they are disposed parallel to one another, a clamping and engagement arrangement configured to clamp on each of the straps of the second set of straps in succession and to engage them with the straps of the first set of straps in position in the support frame, and at least one comb movable between a disengaged position and an engaged position with each of the straps of the first set when in position in the support frame, the comb occupying a position adjacent to a slot for engaging a strap of the second set of straps, wherein the support frame for supporting the straps of the first set of straps is secured to a fixed structure, the clamping and engagement arrangement and the comb are mounted to move in respective planes perpendicular to the straps of the first set of straps in position in the support frame and in direction parallel to the straps of the first set of straps, on a first carriage itself mounted on a first guide arrangement secured to the fixed structure to move in a direction parallel to a longitudinal direction of the straps of the first set of straps, said first carriage carrying a second guide arrangement configured to guide a second carriage and a third guide arrangement configured to guide a third carriage, on respective first and second sides of the support frame, in planes perpendicular to the straps of the first set of straps and in directions parallel to straps of the first set of straps, said clamping and engagement arrangement being fixed on said second carriage and said comb on said third carriage for being moved towards and away from the support frame in opposite directions, on the first and second sides of the support frame, said clamping and engagement arrangement having two jaws movable in translation parallely to each other in opposite directions under the control of a cam and studs for retracting springs of a strap of the second set of straps engaged in the clamping arrangement by pressing them into the thickness of the strap, wherein the springs are retracted by being pressed into the thickness of each of the straps of the second set of straps by using the clamping and engagement arrangements prior to engaging the strap of the second set of straps on the straps of the first set of straps.

\* \* \* \* \*

UNITED STATES PATENT AND TRADEMARK OFFICE
CERTIFICATE OF CORRECTION

| | | |
|---|---|---|
| PATENT NO. | : 6,621,885 B2 | Page 1 of 1 |
| APPLICATION NO. | : 10/149619 | |
| DATED | : September 16, 2003 | |
| INVENTOR(S) | : Christophe Brichet | |

It is certified that error appears in the above-identified patent and that said Letters Patent is hereby corrected as shown below:

<u>Title page,</u>
Item [57], ABSTRACT,
Line 3, change "...clamping and engagement for clamping..." to -- clamping and engagement means for clamping... --

Signed and Sealed this

First Day of May, 2007

JON W. DUDAS
*Director of the United States Patent and Trademark Office*